Dec. 16, 1969  L. F. CARRIERI  3,483,891
HYDRAULIC VALVE
Filed March 8, 1967  3 Sheets-Sheet 1
FIG. 1
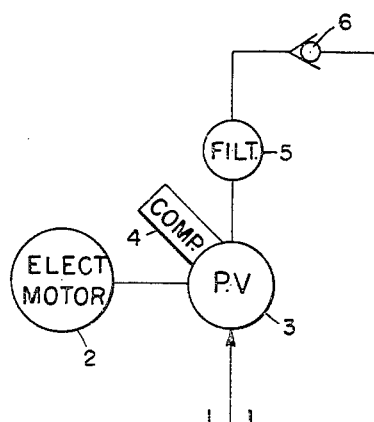
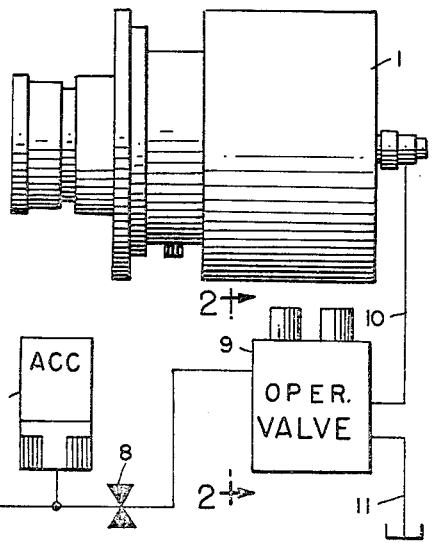
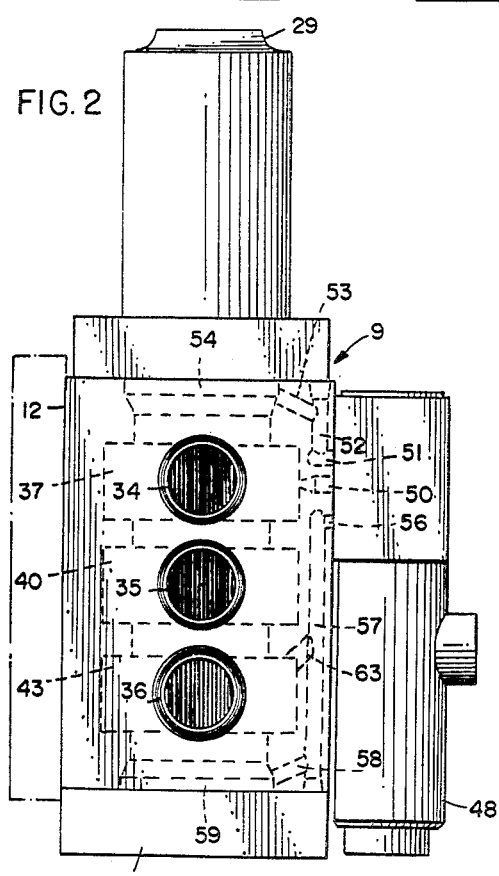
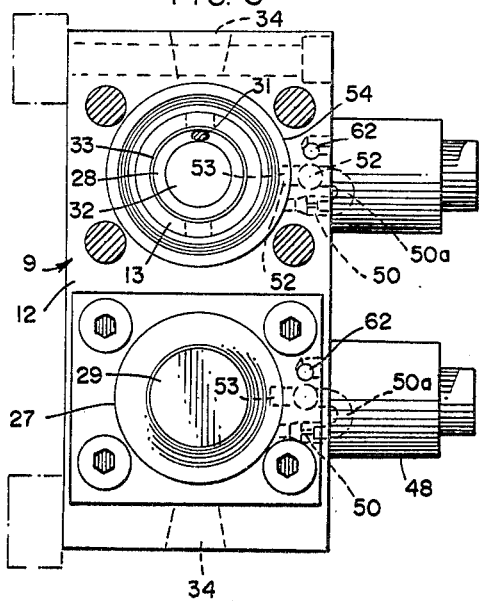
FIG. 2
FIG. 3
INVENTOR:
LOUIS F. CARRIERI
BY
Marzall, Johnston, Cook & Root
ATT'YS Dec. 16, 1969   L. F. CARRIERI   3,483,891
HYDRAULIC VALVE Filed March 8, 1967   3 Sheets-Sheet 2

INVENTOR:
LOUIS F. CARRIERI
BY
Marzall, Johnston, Cook & Root
ATT'YS

Dec. 16, 1969  L. F. CARRIERI  3,483,891
HYDRAULIC VALVE

Filed March 8, 1967  3 Sheets-Sheet 3

INVENTOR:
LOUIS F. CARRIERI
BY
Marzall, Johnston, Cook & Root
ATT'YS

United States Patent Office 3,483,891
Patented Dec. 16, 1969

3,483,891
HYDRAULIC VALVE
Louis F. Carrieri, La Grange Park, Ill., assignor to U.S. Industries, Inc., New York, N.Y., a corporation of Delaware
Filed Mar. 8, 1967, Ser. No. 621,509
Int. Cl. F15b 20/00, 21/08
U.S. Cl. 137—596.16                        4 Claims

ABSTRACT OF THE DISCLOSURE

A dual spool type hydraulic valve for actuating a device operable by fluid under pressure, such as a single-acting cylinder. Solenoid actuated pilot valves operate the main valve, the spools of which are connected in parallel, to direct fluid from an accumulator to the fluid operable device in one position of the spools and from the device to the tank in the other position thereof. Escape of fluid under pressure to tank during shifting of the spool position is prevented by closing the passage to tank before opening the passage to the device.

BRIEF SUMMARY OF THE INVENTION

The invention relates to hydraulic valves for controlling the operation of a device operable by fluid under pressure. It is particularly applicable for use in connection with a single-acting cylinder and piston arrangement where the fluid under pressure forces the piston in one direction, and other means are used to move the piston in the opposite direction.

Problems of safety arise in designing hydraulic valves to insure against a build-up of unsafe pressures at the device when the valve becomes inoperable due to malfunctioning. In the present invention the valve consists of two axially shiftable spool valves connected in parallel to a source of fluid under pressure, such as an accumulator. The arrangement of the spools within their housings in relation to the ports connected to the accumulator, the tank and the device to be operated, is such that when either valve fails to function, the two spools will be out of phase with each other and the port connected to the device to be operated will be opened to the tank, whereby minimal pressure will prevail.

Also, the invention contemplates a construction whereby during the shifting of the spools the port connected to the tank will be closed before the port connected to the accumulator is opened, thereby to prevent the escape of accumulator power to the tank during such shifting.

In view of the foregoing it is therefore a principal object of the present invention to provide a dual hydraulic valve of the spool type for actuating a device operable in response to fluid under pressure and which is so constructed as to remain safe at all times, even though it may become inoperative due to malfunction.

Another object is to provide a dual hydraulic valve of the spool type for actuating a device operable in response to fluid under pressure wherein the spools thereof are shifted axially by operation of pilot valves to direct fluid either to the device or to a tank.

A further object is to provide a dual hydraulic valve of the spool type wherein the spools thereof are connected, in parallel, to a power source of fluid under pressure, whereby a failure or malfunction of one will cause it to become out of phase with the other and discharge the fluid from the pressure source to tank at a controlled flow rate, so that pressure at the port connected to the device to be operated drops to a minimal safe value.

Still another object of the invention is to provide a dual hydraulic valve of the spool type, wherein the spools thereof operate to close the passage to the tank before opening the passage to the device to be operated during shifting of the spools from the inoperative to the operative position, thereby creating a "dead band" when there is no communication between any of the valve ports, and preventing escape of fluid under pressure to the tank.

Other objects and advantages of the invention will become apparent upon reading the following description taken in conjunction with the accompanying drawings, in which FIG. 1 is a diagrammatic illustration showing the general arrangement of various parts of a typical hydraulic system in which the valve of the present invention is adapted to operate;

FIG. 2 is an end elevational view of the valve embodying the present invention and taken substantially along the plane of line 2—2 in FIG. 1;

FIG. 3 is a top plan view of the valve, partially in section, showing one of the spool valves therein in vertical section and in the inoperative position thereof;

DETAILED DESCRIPTION

Figure 4:
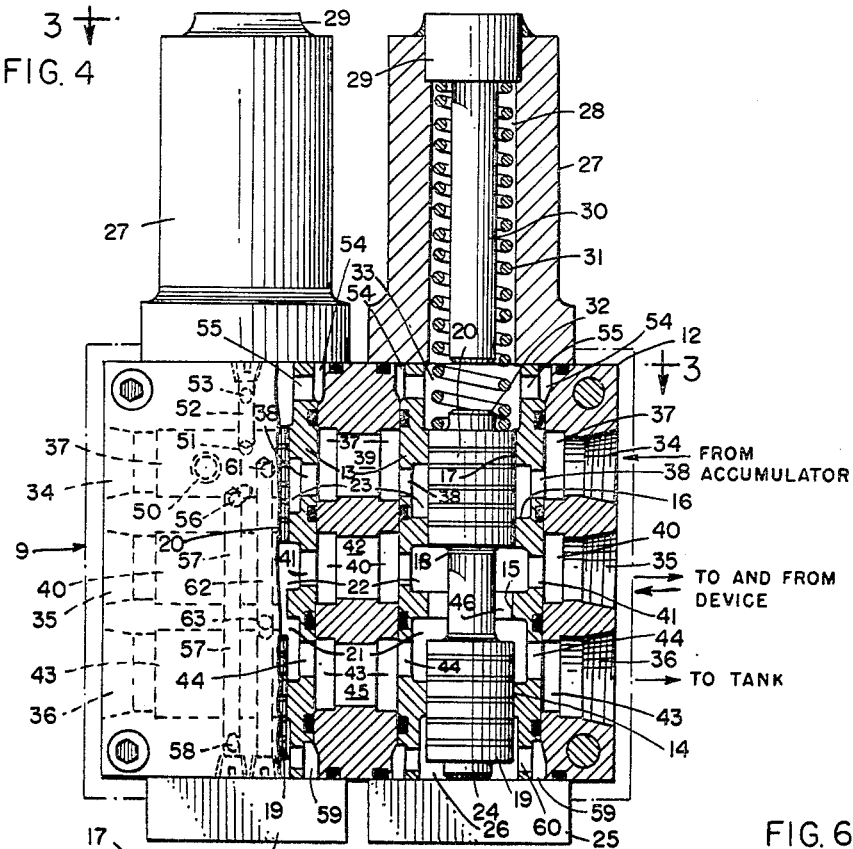
FIG. 4 is a front elevational view of the valve, partly in section, showing one of the spool valves therein in vertical section and in the inoperative position thereof.

Referring now more particularly to the drawings, and especially to FIG. 1, there is illustrated diagrammatically a typical hydraulic system in which the valve of the present invention may be used. As mentioned hereinabove, the valve is intended to actuate a device which is capable of being operated by fluid under pressure. An example of such a device is a single-acting cylinder. More specifically, the device is designed to operate a clutch and/or a brake by the application of fluid pressure thereto. For example, a clutch may have a piston member therein which is normally held in a disengaged position by mechanical means such as springs. Fluid under pressure is used to move the piston against the spring pressure to engage the clutch. The same arrangement may be used to disengage and engage a similarly constructed brake device.

The device which is operable by fluid under pressure is indicated by the numeral 1 in the diagrammatic showing in FIG. 1. An electric motor 2 drives a pump 3 which has associated therewith a pressure compensator 4. The pump 3 forces fluid from a suitable source thereof through a filter 5 and a valve 6 to an accumulator 7. From the accumulator the hydraulic fluid is pumped through a fixed orifice 8 by suitable conduits to the operating valve 9 which embodies the present invention. The operating valve is connected to the device 1 through conduit means 10 and is also connected to the tank by means of a suitable conduit 11. A pressure switch 8' is also in the circuit to prevent energizing the valve if the system pressure is inadequate.

Referring now to the other figures of the drawings, the dual valve preferably comprises a body or housing 12 which is provided with two bores extending therethrough, each of which is adapted to snugly receive a hardened steel insert 13. Each insert is formed interiorly thereof with a plurality of axially spaced annular ribs 14, 15, 16, and 17.

A spool 18 is received within each of the insert 13, each spool being provided at opposite ends thereof with end portions having enlarged diameters as shown at 19 and 20. The diameter of these portions on each spool is such as to provide a sliding fit of the spools with the internal surface of the axially spaced annular ribs formed on the insert.

Between adjacent annular ribs on each insert 13 the diameter of the insert is enlarged so that these portions of the insert with its associated spool forms a chamber. For example, between the ribs 14 and 15 each insert will have a chamber 21. An intermediate chamber 22 is thereby formed between the ribs 15 and 16, while an upper chamber 23 is provided between the ribs 16 and 17. As will be brought out more clearly hereinafter, the spools are caused to reciprocate axially from the inoperative position thereof shown in FIG. 4 to the operative position thereof shown in FIG. 7, and the chambers 21, 22 and 23 are adapted to have hydraulic fluid flow therethrough.

Each spool 18 is provided at the lower end thereof with a short extension of smaller diameter, as indicated at 24. In the lower position of the spools this extension 24 in each case will bottom against the closure member 25 associated therewith. A bottom chamber 26 is then provided around the lower end 19 of each spool which, as will become evident hereinafter, will receive hydraulic fluid under pressure from a pilot valve to shift the spool in an axial direction upwardly.

On top of the housing 12, and immediately above the bore therein which houses the spools, there is provided for each spool a cap 27 having an elongated bore 28 extending therethrough. A closure 29 at the top of each cap seals the upper end thereof and has an elongated rod or stop member 30 extending downwardly therefrom and through the bore 28. The diameter of the rod 30 is smaller than that of the bore 28 thereby to accommodate a compression spring 31.

The upper end of each spool is likewise provided with an extension 32 of smaller diameter than the end of the spool, which extension protrudes upwardly within the coiled spring 31. As is evident, the spring 31 bears at its upper end against the closure member 29 and at the lower end against the upper enlarged end of the spool, thereby urging the spool downwardly to its lowermost and inoperative position shown in FIG. 4.

A chamber 33 is also provided above the top of each spool which is adapted to receive fluid under pressure from a pilot valve to aid in shifting the valve downwardly from operative back to inoperative position. It will be obvious that each spool and its associated hardened insert could be in separate housings rather than a single one, as shown, as long as they are connected into the hydraulic system in parallel.

The housing 12 is provided with a plurality of openings in the walls thereof which are connected, respectively, to the accumulator, the device to be operated, and the tank. The specific locations of such openings are not important, but, as illustrated herein, there are shown three such openings at opposite sides of the housing 12. Two sets of such openings are provided primarily for convenience in connecting the valve into the hydraulic system, only one such set being used, while the other set is plugged.

Figure 7:
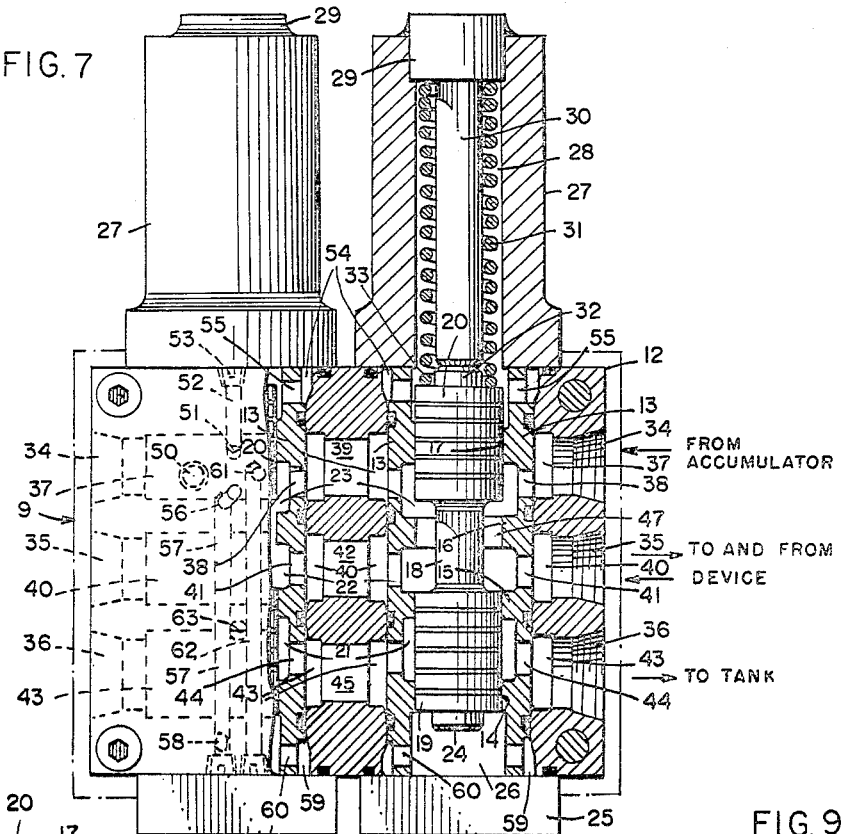
FIG. 7 is a view similar to FIG. 4 but showing the spools in the operative position thereof.
Figure 8:
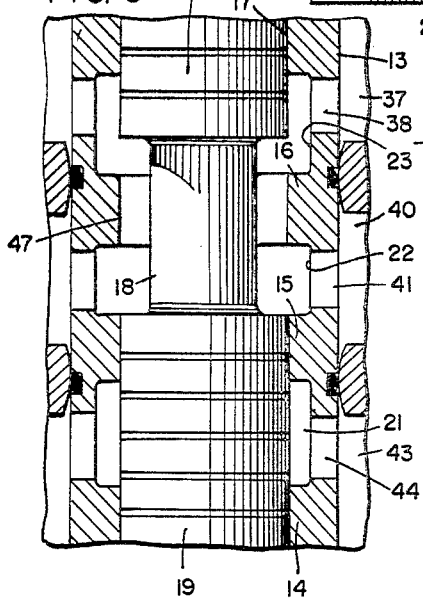
FIG. 8 is a view similar to FIG. 5 showing one of the spools in the operative position thereof.

In FIGS. 4 and 7 of the drawings, a set of three openings is illustrated at the right-hand side of the housing, which openings are indicated by the numerals 34, 35 and 36. The corresponding openings at the opposite side of the housing will be plugged in this instance. As noted from the legends, opening 34 is connected to the accumulator so that fluid will flow therethrough from the accumulator under pressure, as indicated schematically in FIG. 1. Opening 35 is connected by a suitable conduit to the device 1 to be operated, such conduit being identified in FIG. 1 by the numeral 10. As will become evident hereinafter, the flow of fluid through opening 35 is to the device when the valve is in the operative position, and from the device when the valve is moved to the inoperative position.

Opening 36 is connected to the tank by means of the conduit 11, as shown in FIG. 1 Flow of fluid through the opening 36 is always to the tank, and such flow occurs when the valve is moved to the inoperative position thereof, as shown in FIG. 4.

Within the housing 12 it will be seen that the opening 34 communicates with an annular cavity 37 surrounds the hardened insert 13. Each of the inserts 13 is provided with a plurality of circumferentially spaced ports 38 which communicate with the annular cavity 37 associated therewith, and with the annular chamber 23. There will be one such annular cavity 37 around each of the inserts 13 and these cavities are connected together by means of a passage 39 extending therebteween. It will be evident that fluid flow from the accumulator through passage 34 will enter the cavity 37 and will pass through the ports 38 into the chamber 23. The fluid will likewise flow from the cavity 37 through the passage 39 to the cavity 37 at the opposite side of the housing 23. The fluid will also flow through the openings 38 around the other insert and into the chamber 23 thereof. Under normal operation, therefore, and when the valve is in the inoperative position as shown in FIG. 4, fluid under pressure from the accumulator will be located in the cavities 37 and chambers 23. The pressure compensator 24 will operate in the normal way to prevent the pressure from exceeding a predetermined maximum.

The opening 35 is connected to the device to be operated by means of a conduit 10, as illustrated schematically in FIG. 1. The inner end of the opening 35 connects with an annular cavity 40 surrounding the hardened insert 13. This cavity also connects with a plurality of circumferentially spaced ports 41 formed in the insert, each of which, in turn, communicates with the annular chamber 22 around the spool 18.

Again, it will be noted that a similar cavity 40 surrounds the insert in the adjacent valve in the other half of the housing and the two annular cavities 40 are connected by means of a passageway 42 therebetween. In the inoperative position of the spools as shown in FIG. 4, the device which is to be operated by the fluid under pressure will have been de-activated so that the fluid flow will be from the device back through the valve and to the tank. As the fluid flows from the device through opening 35 it will pass into the cavity 40 around the first insert 13 and through passage 42 to the cavity 40 around the other insert. The fluid will also pass through the ports 41 surrounding both spools and into the respective chambers 22.

Opening 36 is connected at its inner end with the annular cavity 43 surrounding the insert 13 which, in turn, is connected with a plurality of circumferentially spaced ports 44 in the body of the insert. These ports 44 connect with the annular chamber 21 surrounding the spool. An identical arrangement is provided in the other half of the housing so that fluid may pass between the chambers 21 and cavities 43 through the connecting passage 45.

The internal annular rib 15, while having a diameter which is substantially equal to that of the enlarged end 19 of the spool, nevertheless is larger than the intermediate portion of the spool 18 so that an annular passage 46 is created between the rib 15 and the spool when in the inoperative position thereof as in FIG. 4. The same construction prevails with respect to both spools. It will be evident therefore upon viewing FIG. 4, that when the fluid is drained from the device which has been de-activated, it will return to the valve through opening 35, cavities 40, ports 41, and chambers 22, through the annular passages 46 to chambers 21, and thence outwardly through ports 44 and cavity 43 and through opening 36 back to the tank by means of a conduit 11, as illustrated schematically in FIG. 1.

The spools 18 are held downwardly in the inoperative position of FIG. 4 by means of the compression springs 31 above each spool and by means of fluid pressure as well, which is fed into the chamber 33 above each spool from a pilot valve. The detailed operation of the pilot valves which actuate the main spool valve will appear more fully hereinafter, but for the present it is sufficient to note that when the main valve containing the spools 18 is to be moved to the operative position to operate the device, fluid under pressure is directed to the chamber 26 below each of the spools. At the same time the fluid in the chambers 33 will be open to tank so that when pressure in the chambers 26 exceeds that of the springs 31, each spool 18 will be shifted axially upwardly to the positions shown in FIG. 7, which thereupon directs fluid under pressure to the device to be operated.

Referring now to FIG. 7 which shows the spools in their operative position, it will be seen that fluid under pressure from the accumulator will pass through the opening 34, cavity 37, and ports 38 into the chamber 23. Fluid will also pass through the passage 39 into the same areas surrounding the other spool. In this position of the spools, however, it will be noted that the intermediate portion of smaller diameter will be opposite the internal annular rib 16, thereupon to produce the annular passage 47. Fluid under pressure in chambers 23 will thereupon flow through the annular passages 47 and into the adjacent chambers 22 from whence it will flow outwardly through the ports 41, cavity 40, and openings 35 to the device to be operated, through the conduit 10 as shown in FIG. 1.

Figure 5:
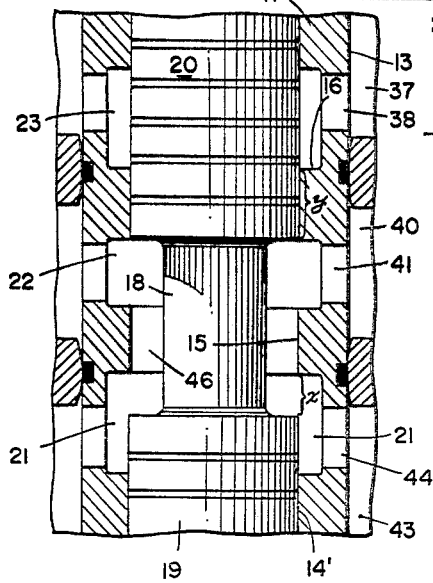
FIG. 5 is a somewhat enlarged fragmentary vertical sectional view of the valve shown in section in FIG. 4, but illustrating more clearly the "dead band" effect.

One of the features of the invention is the design and arrangement of parts which will prevent any power loss due to the flow of fluid from the accumulator to the tank during movement of the valve parts to operative position. In the present instance this is accomplished by making the distance through which the spool moves to close the passage to the tank less than the distance through which the spool must move to open the passage between the accumulator and the device. FIG. 5 illustrates this point, wherein it will be noted that the upper end of the lower enlarged portion 19 of the spool is spaced downwardly from the lower edge of the annular rib 15 a distance $x$. In this inoperative position of the valve, the lower end of the upper enlarged part 20 is in line with the lower edge of the annular rib 16 which has an axial thickness indicated by $y$.

In order for the valve to function to prevent power loss due to the flow of fluid from the accumulator to the tank during movement of the valve from inoperative to operative position, the distance $x$ must be less than the distance $y$. In this inoperative position of FIGS. 4 and 5, the passages from the device are open to the tank. Passage of fluid to the tank will be closed during the upward movement of the spools as soon as the movement thereof is in excess of the distance $x$. As long as this distance in excess of $x$ is less than $y$, there will be a so-called "dead band" or a brief period when there will be no communication whatsoever between the openings 34, 35 and 36. When the spools have moved a distance substantially equal to or in excess of $y$, there will then be communication between the openings 34 and 35 through the chambers 23 and 22 and the annular passage 47.

If the distances $x$ and $y$ were to be substantially equal, there would be a brief moment when there would be no communication not only between the openings 34 and 35, but also between the openings 35 and 36 as well as between the openings 34 and 36, whereupon fluid from the accumulator would flow to the tank and thus some fluid and power would be lost requiring replenishment of the fluid thereafter. This would result in inefficient operation of the valve and the hydraulic system. The above described arrangement prevents any such loss of power and consequent inefficient operation.

Solenoid operated pilot valves are provided to operate the main valve by feeding pilot fluid under pressure to the top or bottom of the spools, depending upon whether they are to be moved to the inoperative or operative positions. These pilot valves are indicated in FIG. 3 by the numerals 48 and 49 and each is mounted on the front of the housing containing the main valve spools 18. The housing of the main valve contains a series of passageways adjacent each spool which cooperate with passageways in the body of the adjacent pilot valve to direct fluid under pressure from the accumulator either to the chambers 33 above the spools or to the chambers 26 below the spools or to the tank, depending upon the position of the spools.

Attention is now directed to FIGS. 2, 3, 4, and 7 where these various cooperating passageways are shown in dotted lines, it being understood that there are identical arrangements associated with each valve spool. In FIG. 2 there is shown a port 50 in communication with the annular cavity 37 around the insert 13. When the pilot valves have been actuated to move the main valve spools to their inoperative position, fluid from the accumulator will enter the opening 34 into the cavity 37 and a part of it will flow through the port 50 and through a passageway 50a in the pilot valve connected to the port 51. The fluid then flows through the passageways 52 and 53 into the annular chamber 54 and through ports 55 into the chamber 33.

When the pilot valve associated with each main valve spool is shifted by its solenoid to move the respective spools to their operative position to actuate the device to be operated, the flow of fluid will take place from the accumulator thorugh the port 50 as before, except that this time the fluid will be directed through the pilot valve and into a port 56 in communication with a vertical passageway 57 which directs fluid through the connecting passage 58 into the annular chamber 59 at the bottom of the insert and through the ports 60 into the lower chamber 56 at the bottom of each spool.

The pressure of his fluid, when it exceeds the pressure exerted by the spring 31 and the fluid in chamber 33, will shift the main valve spools upwardly during which time the fluid from the chambers 33 above the spools will move in the reverse direction through the ports 55 and chamber 54, through the passages 53, 52 and 51. At this time, however, port 51 is in communication with port 61 (see FIGS. 4 and 7) which then directs fluid through the vertical passageway 62, which may be seen in FIGS. 4 and 7 but which is immediately behind the passage 57 in FIG. 2 and is not visible in that view. A passage 63 connects the passage 62 with the annular cavity 43 surrounding the insert at the bottom thereof which leads to the tank through the opening 36.

Thus, when the solenoid valves have been actuated to divert pilot fluid to the chambers above the valve spools, they will be moved to their inoperative position, as shown in FIG. 4, where fluid is drained from the device back to the tank. When the solenoid operated pilot valves are actuated to divert pilot fluid under pressure to the chambers below the main valve spools, they will be moved axially to their operative position, as shown in FIG. 7, where, as previously described, fluid under pressure from the accumulator will be directed to the device to be operated and the fluid from above each spool will be directed back to the tank.

Figure 6:
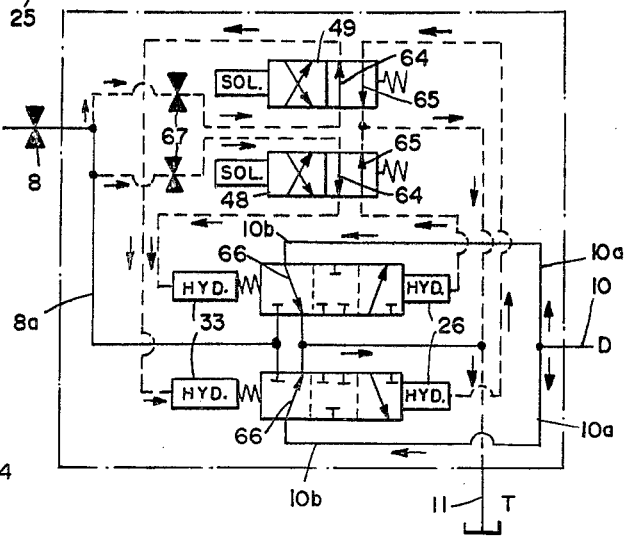
FIG. 6 is a schematic diagram showing the positions of, and the flow of fluid through, the pilot and main valves when in an inoperative position.
Figure 9:
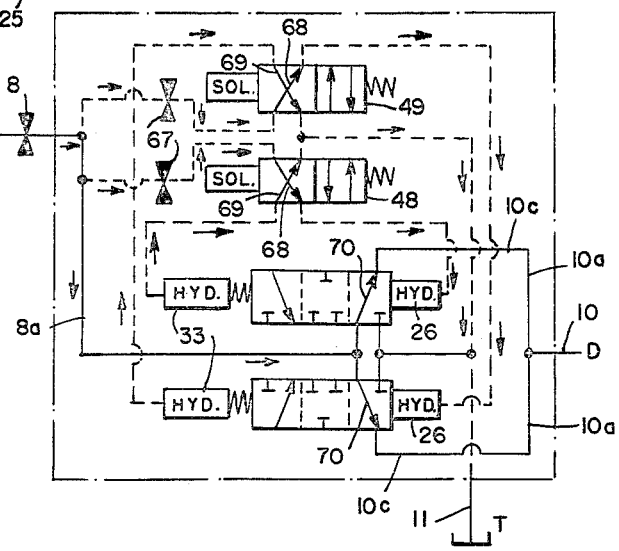
FIG. 9 is a schematic diagram similar to FIG. 6 but showing the positions of, and the flow of fluid through, the pilot and main valves when in the operative position thereof.

Reference will now be made to FIGS. 6 and 9 which are diagrammatic representations of the solenoid pilot valves and the main valve illustrating the flow of hydraulic fluid in the system when the main valve spools are in the inoperative and the operative positions, respectively. In FIG. 6 the flow of fluid is shown with the valve in inoperative position at which time the solenoids will be de-energized. Fluid under pressure from the accumulator passes through the fixed orifice 8 and is directed through the conduit 8a to one end of each valve, which valves are shown as being connected in parallel. According to FIG. 6, there will be no flow of fluid from the accumulator beyond the point at which the fluid enters the valves so that it may be considered that the various cavities 37 and chambers 23 are filled with fluid and the maximum desired pressure has been reached.

Also, in this position some fluid under pressure from the accumulator will be diverted through the passages indicated by the dotted lines in FIG. 6, and will be carried through the pilot valves in the direction of the arrows 64 and to the chambers 33 located above each of the main valve spools.

Fluid from the bottom chambers 26 of each main valve spool will be forced outwardly from the bottom of the main valve, and in FIG. 6 the flow of fluid will be from the chambers 26 in the direction of the arrows and through the pilot valves in the direction of the arrows 65 back to the tank through the conduit 11. At the same time fluid will flow from the device to be operated back through the conduit 10 and the diagrammatically shown conduits 10a and 10b in FIG. 6, through the main valves in the direction of the arrows 66 and back through the conduit 11 to the tank. Numeral 67 represents the fixed orifices through which fluid flows from the accumulator to the solenoid operated valves.

When it is desired to operate the device, the solenoids will be energized to shift the pilot valves to their positions shown diagrammatically in FIG. 9. In this position, flow of fluid from the accumulator through orifice 8 will follow the direction of the arrows on the dotted lines in FIG. 9 and will pass through the pilot valves in the direction of the arrows 68 and through the dotted line path to the conduit which carries the fluid to the bottom chambers 26. This pressure on the bottom of each main valve spool will force the spool upwardly as heretofore described. Simultaneously, the fluid will be exhausted from the chambers 33 above the spools and will flow outwardly therefrom in the direction of the arrows adjacent the dotted line paths of flow, through the pilot valves in the direction of the arrows 69 and thence back to the tank through conduit 11.

This shifting of the main valve spools will thereupon cause fluid to flow from the accumulator through the orifice 8 and conduit 8a in FIG. 9 in the direction of the arrows adjacent thereto and through the spool valves in the direction of the arrows 70. The fluid is then carried through the diagrammatically shown conduits 10c and 10a in FIG. 9, through the conduit 10 to the device, which thereupon receives the fluid under pressure to cause the operation thereof.

In addition to the "dead band" advantage which prevents escape of accumulator power to the tank during valve shifting, the structure embodying the invention above described creates a safe condition under all types of malfunctioning, with the possible exception where two or more failures may occur simultaneously, which is highly improbable. The safe condition of the valve means that when any malfunction occurs, or any part of the valve fails to function properly, the port opening to the device will always be open to the tank port with minimal pressure at the device port.

An example of a malfunction which can occur singularly and render the valve inoperable but still in safe condition is the failure of either pilot valve due to sticking or jamming in either the open or closed position. In the de-energized condition system pressure will be bypassed to tank and pressure at the device and in the pilot system will be minimal. When the pilot valves are energized, pilot pressure will be too low to move the functioning main spool against its spring. Therefore, the device cannot be actuated. Thus, supposing the valve has been moved to operative position as shown in FIG. 7, and either one of the main valve spools sticks or jam in this position due to its own malfunction or malfunctioning of the pilot valve, while the other main valve spool is moved to the inoperative position thereof, it will be evident that in such position one of the spools will have been moved to the position shown in FIG. 4 where the device port will be in communication with the tank port. Assuming that the right-hand valve spool remains in the operative position of FIG. 7, and the left-hand valve spool is moved to the inoperative position as shown in FIG. 6, fluid from the accumulator will pass through the ports 38 and chambers 23 to the left-hand spool which then, being in the position of FIG. 4, will divert fluid through the associated annular passage 46 and back to the tank. Thus, minimal pressure at the device is maintained if either main valve spool is in the inoperative position thereof due to malfunctioning of the main valve or the pilot valves. Such pressure is far less than that required for actuation of the device.

Where one pilot valve is stuck in the energized position thereof, the main spool operated by such pilot valve will remain partly shifted in the energized position, since pilot pressure is applied to the bottom of the spool holding it against its spring. Pilot pressure and system pressure, however, are a minimal value since flow through the partly open spool is bypassing through the second spool to the tank. If in this condition the pilot valves could be energized, the second main spool would also move against its spring stopping the fluid flow to the tank and allowing system pressure to build up and actuate the device. They cannot be energized, however, because in this condition system pressure would be well below the setting of the pressure switch 8' which prevents operation unless proper system pressure is maintained.

Furthermore, if the pilot valves utilize springs, failure of either of these springs will still allow at least one of the main valve spools to return to the inoperative position where the fluid is directed back to the tank. Such failure of springs cannot be detected but the springs are designed extremely conservatively and should give infinite life operating in filtered oil.

The chances of both pilot valves or both main valve spools sticking or jamming in either position thereof simultaneously is so remote that the possibility need not be considered seriously.

This dual three-way operating valve will retain its safe operating features when used up to its rated flow capacity. When an accumulator is used, as illustrated in FIG. 1, flow is limited to the rated capacity by the flow control device or orifice as shown at 8 in FIG. 1.

The invention is hereby claimed as follows:

1. A dual hydraulic valve for use in a hydraulic system containing a source of hydraulic fluid under a predetermined maximum pressure, a tank, and a device operable by hydraulic fluid pressure, said valve comprising
   (a) a pair of main spool valve members each located in a bore within a housing and shiftable axially therein between operative and inoperative positions,
   (b) first conduit means connecting said spool valve members with the source of fluid under pressure,
   (c) second conduit means connecting said spool valve members with the device to be operated,
   (d) third conduit means connecting said spool valve members with the tank,
   (e) a plurality of passages between said spool valve members and said conduits so arranged that
      (1) when said spool valve members are in their operative position fluid will flow from the source of fluid under pressure to the device for activating same, and
      (2) when said spool valve members are in their inoperative position fluid will flow from the device to the tank, thereby de-activating the device.
   (f) yieldable means exerting a predetermined minimum pressure against each of said spool valve members to maintain them normally in the inoperative position thereof, (g) a fixed orifice of predetermined size in said first conduit means through which hydraulic fluid flows to said spood valve members from the source of hydraulic fluid, (h) fluid means supplied by fluid from said first conduit means and downstream of said fixed orifice to shift said spool valve members to operative position substantially simultaneously, (i) said spool valve members being connected with all of said conduit means in parallel, whereby failure of either spool valve member to function properly will result in communication between said first and third conduit means, thereby carrying fluid from source to tank, and (j) the cross-sectional area of said fixed orifice being smaller than the cross-sectional area of said first conduit means and sized so that when such failure of either spool valve member occurs, the flow of fluid through said orifice will produce such a pressure drop through the valve when said first and third conduit means are in communication that the resulting pressure of said fluid means will be insufficient to overcome the predetermined minimum pressure of said yieldable means.

2. A dual hydraulic valve as defined in claim 1, wherein the passages between said first and second conduit means, and the passages between said second and third conduit means are so arranged with respect to said main spool valve members that as said main spool valve members shift from their inopeartive position to the operative position thereof the passages between the second and third conduit means will close before the passages between first and second conduit means are opened, thereby creating a dead band where none of said conduit means are in communication with each other and preventing escape of fluid under pressure to the tank.

3. A dual hydraulic valve for use in a hydraulic system containing a source of fluid under pressure, a tank, and a device operable by fluid pressure, said valve comprising (a) a pair of main spool valve members each located in a bore within a housing and shiftable axially therein between operative and inoperative positions, (b) first conduit means connecting said spool valve members with the source of fluid under pressure, (c) second conduit means connecting said spool valve members with the device to be operated, (d) third conduit means connecting said spool valve members with the tank, (e) a plurality of passages between said spool valve members and said conduits so arranged that (1) when said spool valve members are in their operative position fluid will flow from the source of fluid under pressure to the device for activating same, and (2) when said spool valve members are in their inoperative position fluid will flow from the device to the tank, thereby de-activating the device, (f) means to shift said spool valve members substantially simultaneously including a pilot valve associated with each of said main spool valve members and operable to direct hydraulic fluid to one end of its associated main spool valve member to shift it in one direction and to the other end of its associated main spool valve member to shift it in the other direction, (g) said spool valve members being connected with all of said conduit means in parallel, whereby failure of either spool valve member to function properly will result in communication between said first and third conduit means, thereby carrying fluid from source to tank with minimal pressure prevailing.

4. A dual hydraulic valve as defined in claim 3 including solenoid means operable to actuate each said pilot valve.

References Cited

UNITED STATES PATENTS

| | | | |
|---|---|---|---|
| Re. 25,251 | 10/1962 | Quail | 137—625.59 XR |
| 2,117,595 | 5/1938 | Baule | 97—424 XR |
| 2,650,609 | 9/1953 | Herbst | 137—596.14 |
| 2,843,864 | 7/1958 | Haas | 137—596.16 XR |
| 2,854,998 | 10/1958 | MacGlashan et al. | 137—625.69 XR |
| 2,970,611 | 2/1961 | Hoge | 137—596.16 |
| 2,986,121 | 5/1961 | Norwack | 91—424 |
| 3,043,335 | 7/1962 | Hunt | 91—424 XR |
| 3,110,321 | 11/1963 | Broad | 137—596.15 |
| 3,265,089 | 8/1966 | Nill | 137—596.16 |
| 3,352,324 | 11/1967 | Stryker | 137—625.69 |

M. CAREY NELSON, Primary Examiner

R. J. MILLER, Assistant Examiner

UNITED STATES PATENT OFFICE
CERTIFICATE OF CORRECTION

Patent No. 3,483,891  Dated December 16, 1969

Inventor(s) Louis F. Carrieri

It is certified that error appears in the above-identified patent and that said Letters Patent are hereby corrected as shown below:

Column 2, lines 18-19, "showing one of the spool valve therein in vertical section and in the inoperative position thereof;" should read --and taken substantially along the plane of line 3-3 in Fig. 4;--, line 35, "mall" should read "main".

Column 6, line 35, "thorugh" should read --through--.

Column 9, line 30, "inopeartive" should read --inoperative--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents